US012590477B2

(12) United States Patent
Reusch

(10) Patent No.: US 12,590,477 B2
(45) Date of Patent: Mar. 31, 2026

(54) MOTOR VEHICLE LOCK, IN PARTICULAR MOTOR VEHICLE DOOR LOCK

(71) Applicant: KIEKERT AG, Heiligenhaus (DE)

(72) Inventor: Manuel Reusch, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 115 days.

(21) Appl. No.: 18/552,508

(22) PCT Filed: Mar. 10, 2022

(86) PCT No.: PCT/DE2022/100198
§ 371 (c)(1),
(2) Date: Sep. 26, 2023

(87) PCT Pub. No.: WO2022/207034
PCT Pub. Date: Oct. 6, 2022

(65) Prior Publication Data

US 2024/0167303 A1 May 23, 2024

(30) Foreign Application Priority Data

Mar. 31, 2021 (DE) ..................... 10 2021 108 162.9

(51) Int. Cl.
*E05B 81/90* (2014.01)
*E05B 81/06* (2014.01)
(Continued)

(52) U.S. Cl.
CPC .............. *E05B 81/90* (2013.01); *E05B 81/06* (2013.01); *E05B 81/14* (2013.01); *E05B 81/30* (2013.01)

(58) Field of Classification Search
CPC .......... E05B 81/06; E05B 81/14; E05B 81/30; E05B 81/90; E05B 83/26
(Continued)

(56) References Cited

U.S. PATENT DOCUMENTS 5,445,326 A * 8/1995 Ferro ....................... E05B 83/26
292/DIG. 43
5,642,636 A * 7/1997 Mitsui ..................... E05B 77/40
292/201
(Continued)

FOREIGN PATENT DOCUMENTS

CN 207436685 U 6/2018
DE 102005057332 A1 * 6/2007 ............. E05B 83/26
(Continued)

OTHER PUBLICATIONS

International Search Report mailed Jun. 2, 2022, for priority International Application No. PCT/DE2022/100198.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A motor vehicle lock, in particular a motor vehicle door lock, which is equipped with a locking mechanism substantially comprising a rotary latch and a pawl. In addition, an electrical opening drive is provided for the locking mechanism as well as an emergency actuating element for manual emergency opening of the locking mechanism. According to the invention, the emergency actuating element is designed in a first variant such that it can be reset from its actuating position to its rest position via the force of a spring. In a further second alternative variant, the emergency actuating element is designed such that it is locked in its actuating position and can be manually reset to its rest position.

12 Claims, 5 Drawing Sheets

Figure 1:
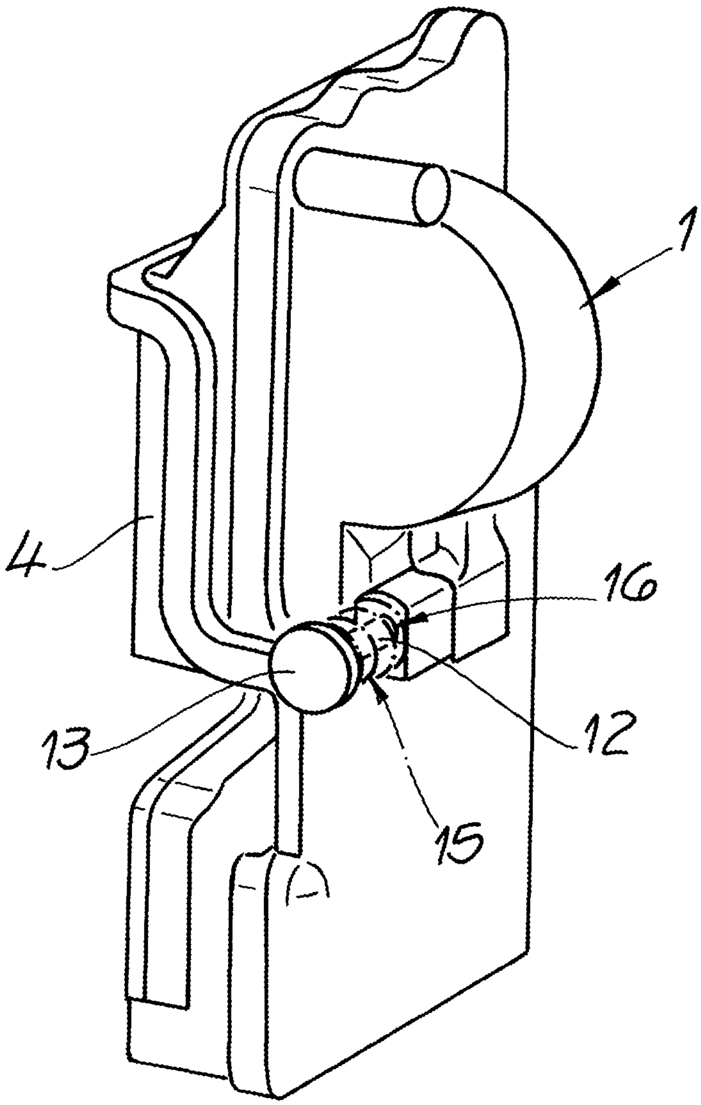

(51) Int. Cl.
*E05B 81/14* (2014.01)
*E05B 81/30* (2014.01)

(58) Field of Classification Search
USPC .......................................................... 70/278.7
See application file for complete search history.

(56) References Cited

U.S. PATENT DOCUMENTS

| | | | | | |
|---|---|---|---|---|---|
| 6,247,732 | B1 * | 6/2001 | Alton | ...................... | E05B 79/20<br>292/216 |
| 8,672,368 | B2 * | 3/2014 | Grosdemouge | ......... | E05B 85/02<br>292/216 |
| 10,697,210 | B2 * | 6/2020 | Hiramoto | ................ | E05B 81/90 |
| 11,377,883 | B2 * | 7/2022 | Taurasi | ................... | E05B 81/16 |
| 2018/0087298 | A1 * | 3/2018 | Strole | .................. | B62D 33/037 |
| 2019/0106914 | A1 * | 4/2019 | Tamura | ................... | E05B 81/90 |
| 2023/0074045 | A1 * | 3/2023 | Fuchs | ..................... | E05B 81/30 |

FOREIGN PATENT DOCUMENTS

| | | | | | | |
|---|---|---|---|---|---|---|
| DE | 202008003845 | U1 | * | 8/2009 | ............. | E05B 79/20 |
| DE | 102008055993 | A1 | | 5/2010 | | |
| DE | 102015004985 | A1 | * | 12/2015 | ............. | E05B 79/22 |
| DE | 102015122359 | A1 | | 6/2017 | | |
| DE | 102018121382 | A1 | * | 3/2020 | ............... | E05B 1/14 |
| GB | 2271374 | A | * | 4/1994 | ............. | E05B 17/04 |
| WO | 2020074032 | A1 | | 4/2020 | | |

* cited by examiner

MOTOR VEHICLE LOCK, IN PARTICULAR MOTOR VEHICLE DOOR LOCK

This application is a national phase of International Patent Application No. PCT/DE2022/100198 filed Mar. 10, 2022, which claims priority to German Patent Application No. 10 2021 108 162.9 filed Mar. 31, 2021, each of which is hereby incorporated herein by reference in its entirety.

The invention relates to a motor vehicle lock, in particular a motor vehicle door lock, comprising a locking mechanism composed substantially of a rotary latch and a pawl, further comprising an electrical opening drive for the locking mechanism, and comprising an emergency actuating element for manual emergency opening of the locking mechanism.

Motor vehicle locks and in particular what are known as electric locks are increasingly used in motor vehicles for comfort reasons. Indeed, such motor vehicle locks and in particular motor vehicle door locks are opened electromotively or electrically by means of the electrical opening drive for the locking mechanism. For this purpose, for example an outside door handle or generally a switch on the outside door handle or independently thereof is actuated. Instead of the switch, a sensor can also be used.

In any case, in this connection the opening request of a user desiring access is typically detected by sensors and transmitted to a control unit, which then in turn acts on the electrical opening drive so that the (closed) locking mechanism can thus be opened electromotively in this manner. For this purpose, the electrical opening drive works, for example, on a release lever, which in turn lifts the pawl from its engagement with the rotary latch. As a result, the rotary latch can pivot upwards in a spring-assisted manner or as a result of the opening force built up by door rubber sealing forces, and releases a previously caught locking pin. As a result, the associated motor vehicle door can be opened. This has proven itself in principle.

Indeed, the emergency actuating element is used predominantly when the electrical or electromotive opening drive for the locking mechanism does not function or does not function sufficiently, for example due to a low on-board power supply voltage of the associated motor vehicle. Comparable scenarios are observed in the event that for example the on-board power supply voltage is interrupted for maintenance purposes, and nonetheless access to the motor vehicle via the relevant motor vehicle door is required. For this purpose, the emergency actuating element must on the one hand be in principle accessible, but on the other hand may not be able to be manipulated from the outside, in order to prevent an unauthorized opening of the associated motor vehicle door.

Indeed, in the category-defining prior art according to WO 2020/074032 A1, which originates from the applicant, the procedure is such that an emergency release means is realized as an emergency actuating element, an operative connection between the electrical or electromotive opening drive and a release lever being able to be released by actuating the emergency release means. The emergency release means is substantially pin-shaped. Furthermore, the emergency release means has a first connecting end comprising a thread or a clip or latching connection. An actuation geometry, which can be designed as a regular polygon, in particular a hexagon, is provided at the other second end of the emergency release means. As a result, the actuation geometry of the emergency release means can thereby be achieved via a recess. A corresponding tool is required for actuating the polygon or hexagon.

The further, and likewise category-defining, prior art according to US 2018/0087298 A1 proceeds similarly. In this case, an emergency actuating element designed as a pivotable lever is implemented, which element acts on a release lever which in turn lifts the pawl from its engagement with the rotary latch in the closed state of the locking mechanism. The locking mechanism thereby undergoes manual emergency opening. However, in this case too, a special contour is provided on or in the emergency actuating element, which ultimately has to be acted upon by means of a special tool in order to pivot the emergency actuating element and thereby bring about the emergency opening of the locking mechanism.

In principle, the prior art has proven successful if it is a case of realizing and implementing the manual emergency opening in the event of failure of the electrical opening drive. However, special and additional tools are required at this point, which makes handling difficult. Furthermore, the relevant emergency actuating element has to be reset by means of the special tools, in order to subsequently ensure flawless functionality of the electrical or electromotive opening drive in normal operation. This is complex and not particularly convenient, simply because the storage of and access to a special tool in practice leads to problems because the relevant tool is not present, can be lost, etc. The invention intends provide overall remedy here.

The invention is based on the technical problem of developing such a motor vehicle lock of this kind, and in particular a motor vehicle door lock, in such a way that the action on the emergency actuating element, and in particular its resetting, takes place as simply as possible and without tools.

In order to solve this technical problem, a motor vehicle lock of the type in question, within the scope of a first variant, is characterized in that the emergency actuating element is designed such that it can be reset from its actuating position into its rest position by the force of a spring.

In this case, the spring in question can be directly assigned to the emergency actuating element. In this case, it has proven expedient for the spring to be designed for example as a helical spring or coil spring that surrounds the emergency actuating element. In principle, the spring can alternatively or additionally also be designed as a pawl spring.

In this case, the invention proceeds from the finding that, with the aid of the spring, the emergency actuating element is reset or returned to the rest position, after being acted upon and from the actuating position assumed thereby. The spring directly assigned to the emergency actuating element can ensure this. Alternatively or additionally, however, the spring force can also be provided by the pawl spring. In this case, the design is such that the emergency actuating element acts indirectly or directly acted upon the pawl for manual emergency opening of the locking mechanism, and lifts said pawl from its latching engagement with the rotary latch. In this case, the pawl spring can now be designed such that it does not only ensure that the pawl is (again) reset or returned to resting on the rotary latch after the pawl has been manually lifted out, but rather, in the context of this variant, the pawl spring may also at the same time convey the emergency actuating element, interacting indirectly or directly with the pawl, from the actuating position into the rest position.

In an alternative second variant, in the case of a motor vehicle lock of the type in question, and in particular motor vehicle door lock, the procedure is such that the emergency actuating element is blocked in its actuating position and is designed such that it can be reset manually into its rest position. That is to say that, in this case, corresponding manual action on the emergency actuating element ensures that this is manually returned to the rest position from its actuating position, with corresponding blocking or friction locking. In this case, a handle connected to the emergency actuating element can be provided for manually resetting the emergency actuating element. The relevant handle may be a flexible handle that acts on the emergency actuating element. For example, this flexible handle can be designed as a cable, cord, pull, Bowden cable, etc.

A variant that is particularly preferred in this context provides that the handle and the emergency actuating element define a structural unit. In this case, in particular an integral structural unit has proven to be particularly favorable. If the emergency actuating element is made of plastics material, for example, the handle in question can in this case be injection-molded onto the emergency actuating element made of plastics material.

In both cases, the action on the emergency actuating element is possible according to the invention not only manually but also without tools. The emergency actuating element is also reset purely manually and also without tools. The handling is thereby simplified overall and, according to the invention, there is in principle no risk that a tool or special tool required at this point in the prior art is not available, has been lost, etc.

In order to nevertheless prevent any unauthorized manipulations, the emergency actuating element is generally covered, i.e. Arranged on the motor vehicle door such that it is not visible. An attachment and arrangement of the emergency actuating element behind a preferably detachable trim has proven to be particularly expedient here. According to a particularly advantageous embodiment, this preferably detachable trim is the interior trim of an associated motor vehicle door. In this case, the term motor vehicle door lock is to be interpreted broadly within the scope of the invention. That is to say that this includes not only motor vehicle side doors, but expressly and explicitly also motor vehicle flaps, such as motor vehicle tailgates, motor vehicle front hoods, motor vehicle tank caps, motor vehicle covers for covering charging sockets, etc.

In the event that the emergency actuating element is arranged behind a preferably detachable trim, and in particular interior trim, of the associated motor vehicle door, the manual emergency opening in the example described can generally be brought about and implemented only from the interior of the motor vehicle. In general, however, the emergency actuating element can also be arranged behind a detachable outer trim of the associated motor vehicle door, for example behind an impact protection strip or also behind an outside door handle, a trim of the outside door handle, etc. As a result, the emergency actuating element is also accessible from the outside so that, in the event of a failure of the electrical or electromotive opening drive, an opening of the corresponding motor vehicle door is nevertheless possible and can be implemented using the emergency actuating element which can be acted upon manually.

In all cases, the emergency actuating element is advantageously designed as an actuating pin which acts indirectly or directly on the pawl. Such an actuating pin has the fundamental advantage that relatively large thrust forces or actuating forces of an operator for manual emergency opening of the locking mechanism can be transmitted thereby. For this purpose, the actuating pin advantageously has a front actuating surface. In this case, the actuating surface projects beyond the generally cylindrical actuating pin on the peripheral side in the form of a plate-like actuating surface, such that in this way the required thrust forces can be applied by an operator during the linear action on the actuating pin. For example, it is conceivable for the plate-like actuating surface to simply be acted on in a sliding and pushing manner, by means of a thumb.

The emergency actuating element generally passes through an opening in a lock housing. Since, as a rule, not only the motor vehicle lock, but also typically the electrical opening drive and a control unit including the associated sensor system, are accommodated in the interior of the lock housing, the design is usually such that the emergency actuating element penetrates the relevant opening in the lock housing in a sealing manner. As a result, in particular when the emergency actuating element is arranged behind a detachable outer trim, it is ensured that, for example, no water, dust, etc. can enter the lock housing from the outside via the opening. Rather, the lock housing still ensures, unchanged, a predominantly media-tight covering of the motor vehicle lock or of the components located in the interior.

In this case, the sealing passage of the emergency actuating element through the opening in the lock housing is generally realized in such a way that the actuating pin advantageously realized in this context has a stepped diameter. Indeed, the actuating pin is in most cases equipped in two parts with a front-side guide element that engages in a cylindrical guide in the lock housing, and an adjoining passage region having a smaller diameter. The passage region passes through the opening in the lock housing and carries the above-mentioned actuating surface on the head side. In this way, the guide region guided in the guide functions at the same time as a stop for the emergency actuating element so that the spring restoring the emergency actuating element can advantageously be arranged as a helical spring between the actuating surface and the lock housing.

An action on the emergency actuating element or actuating pin, in the first variant, now ensures that the corresponding spring is compressed and, after the actuating pin is acted upon, can relax again and in the process reset or return the actuating pin. In this case, the guide region of the actuating pin received in the guide is linearly acted upon and in the process lifts the pawl indirectly or directly from its engagement with the rotary latch. The actuating pin is then returned from its actuating position to the rest position by means of the spring.

In this case, the guide region of the actuating pin moves with its front stop on the inside against the guide in the region of the opening in the lock housing.

The design in the second variant is comparable, with the only difference that in this context the actuating element or the actuating pin is held in its actuating position or is inhibited in its return movement by frictional forces of the guide region within the guide. In order to be able to reset the actuating pin again in this case, the operator must manually reset the emergency actuating element or the actuating pin into the rest position. This is achieved particularly gracefully by the advantageously connected handle and action thereon.

As a result, a motor vehicle lock is provided which provides an in particular tool-free operation or tool-free action in the course of the manual emergency opening and when the emergency actuating element is reset. The operation is thus particularly simple and intuitive, and additional aids are not required. Herein lie the essential advantages.

Figure 2:
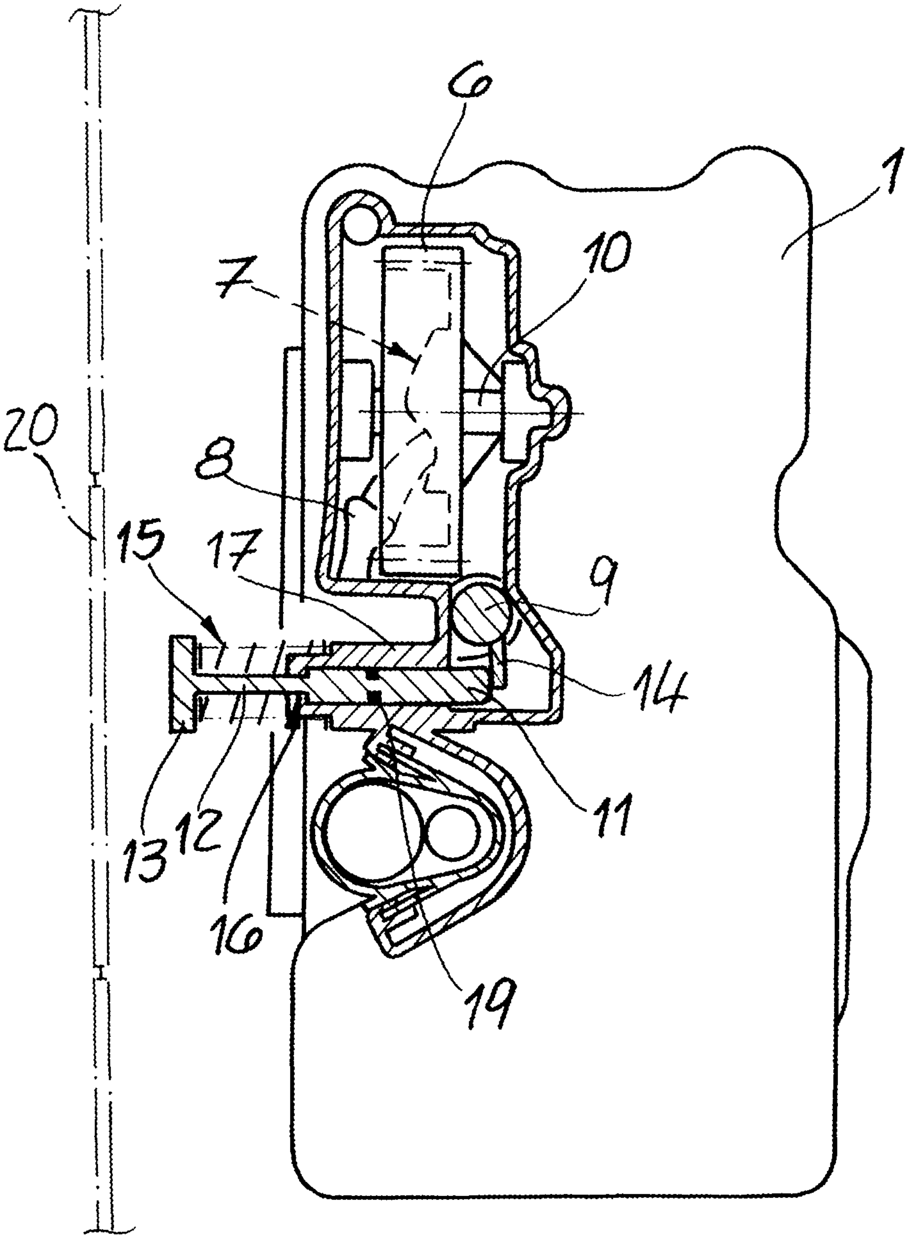
Figure 3:
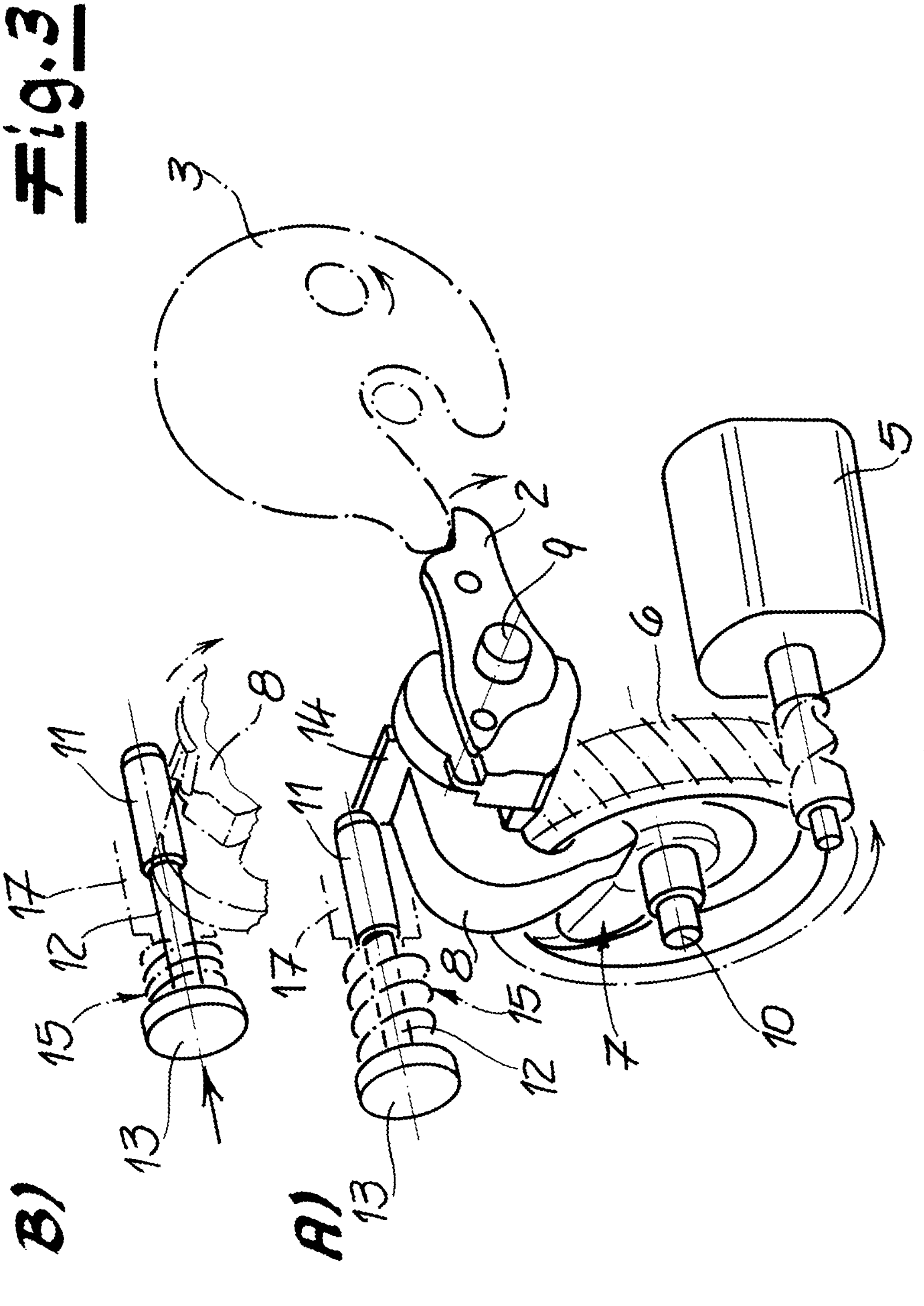
Figure 4A:
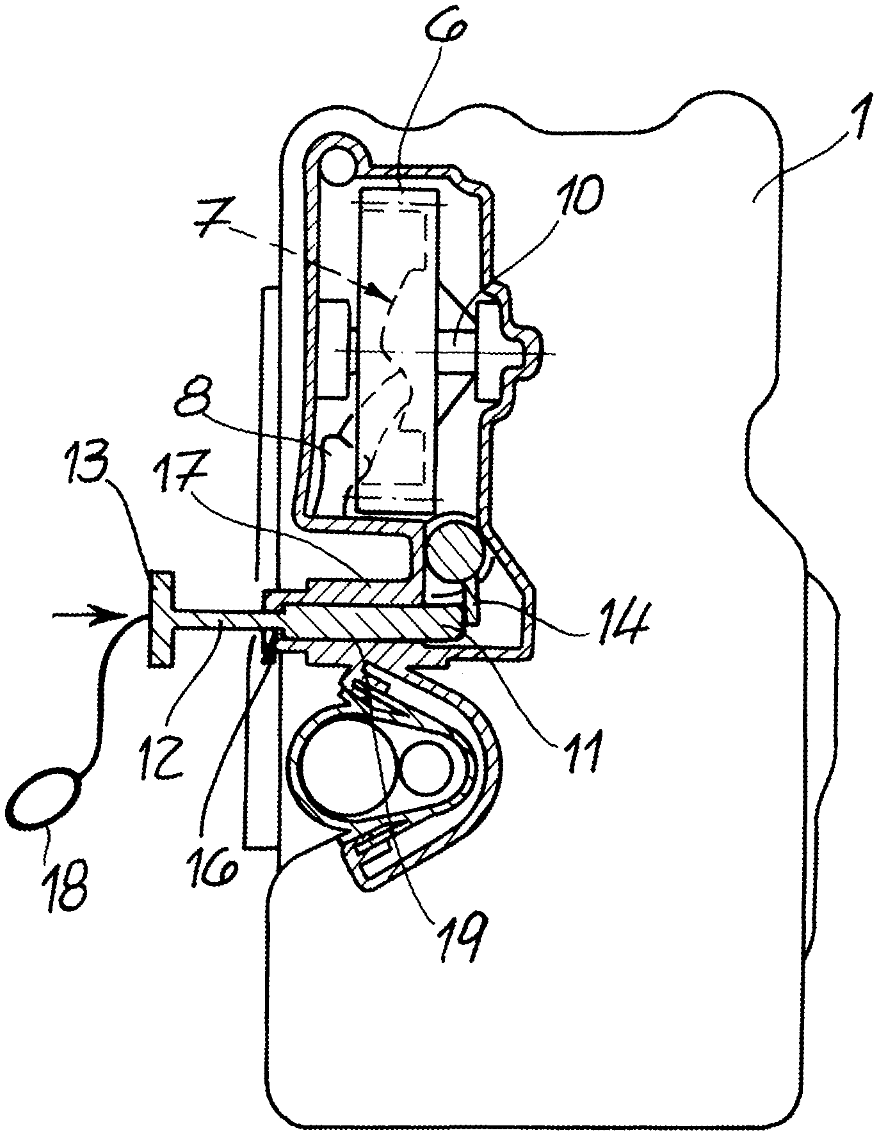
Figure 4B:
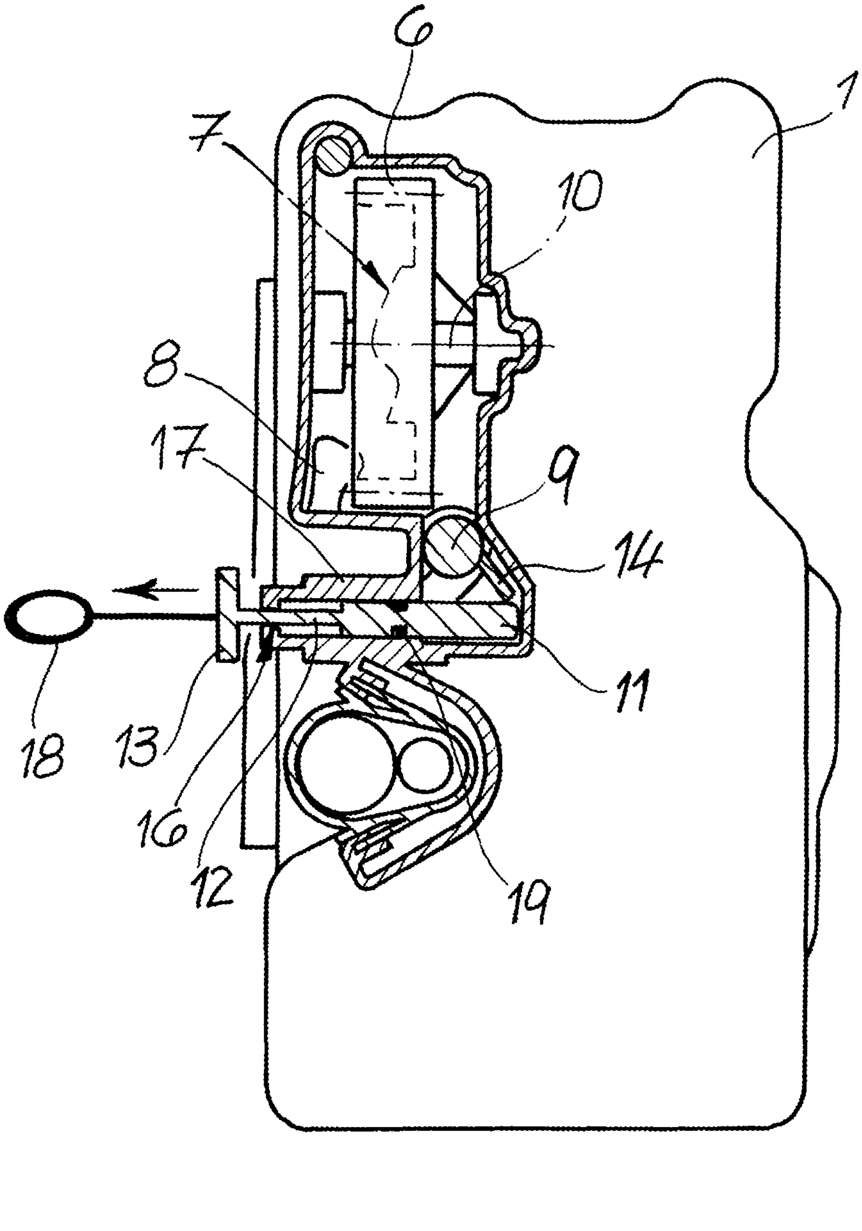

The invention is explained in greater detail below with reference to a drawing which shows only one embodiment. In the drawing:

FIGS. 1 and 2 are perspective and side views, in part in cross-section, of the motor vehicle lock according to the invention, FIG. 3A, 3B show the locking mechanism including the electrical opening drive in a perspective overview together with the emergency actuating element, and FIGS. 4A and 4B show the actuation of the emergency actuating element in the variant comprising a connected handle.

The drawings show a motor vehicle lock which is advantageously and in a non-limiting manner a motor vehicle door lock. The motor vehicle lock in question, and in particular the motor vehicle door lock, is received overall in a lock housing 1 made of plastics material, which is particularly visible in FIGS. 1 and 2. In the interior of the lock housing 1, a locking mechanism 2, 3, which can be seen substantially in FIG. 3, having a merely indicated rotary latch 3 and pawl 2, is rotatably mounted. A metal lock case 4 is provided and realized for mounting the locking mechanism 2, 3.

Furthermore, the motor vehicle lock or motor vehicle door lock shown is equipped with an electrical or electromotive opening drive 5, 6, 7, which operates indirectly on a release lever 8 and thus the locking mechanism 2, 3. Indeed, the release lever 8 is mounted so as to be coaxial with the pawl 2 and so as to be rotatable about a common axis 9. In addition, the release lever 8 and the pawl 2 are coupled to one another in a rotationally fixed manner. The electrical opening drive 5, 6, 7 comprises, for its part, an electric motor 5 which, on the output side, works with a worm on a worm wheel 6 and causes this to rotate about an associated axis 10. According to the embodiment, the worm gear 6 is equipped with a helical spatial contour 7 which works on an end of the release lever 8.

Consequently, a movement of the worm wheel 6 indicated in FIG. 3A, in the counterclockwise direction indicated here, in the case of an electrical opening process, ensures that the end of the release lever 8 resting against the helical contour 7 is moved to the left, following the helical shape and according to the embodiment. This results in a rotation of the release lever 8 about the axis 9 in common with the pawl 2, in the clockwise direction. Since the pawl 2 is coupled to the release lever 8 in a rotationally fixed manner, the pawl 2 is also acted upon in the clockwise direction, and thereby releases the rotary latch 3, with which it was previously in latching engagement in the closed position indicated in FIG. 3A.

As a result, the rotary latch 3 opens, optionally in a spring-assisted manner, and releases a previously caught locking pin (not expressly shown). The electrical or electromotive opening process of the motor vehicle lock in question or of its locking mechanism 2, 3 corresponds to this.

In addition, an emergency actuating element 11, 12, 13 is also realized, specifically for manual emergency opening of the locking mechanism 2, 3. According to the embodiment, this manual emergency opening of the locking mechanism 2, 3 is realized and implemented in such a way that the emergency actuating element 11, 12, 13, within the context of the representation according to FIG. 3A, is manually acted upon, for example with a thumb, by an operator or vehicle user, in the direction of the arrow shown in FIG. 3B. The pushing movement, associated therewith, on the linearly displaceable emergency actuating element 11, 12, 13 results in the emergency actuating element 11, 12, 13 working on a stop 14 arranged on the release lever 8. As a result, the manual action, indicated in FIG. 3B, on the emergency actuating element 11, 12, 13 for manual emergency opening of the locking mechanism 2, 3 corresponds to the release lever 8 being caused, in this case, to rotate about its axis 9 in the clockwise direction, and specifically independently of the opening drive 5, 6, 7. Since the pawl 2 is connected to the release lever 8 in a rotationally fixed manner, this again—as in the case of electrical opening—leads to the pawl 2 being withdrawn from its engagement with the rotary latch 3.

Within the context of the embodiment shown, two basic procedures are now to be distinguished from one another when resetting the emergency actuating element 11, 12, 13. In the context of the variant according to FIG. 3, the emergency actuating element 11, 12, 13 is designed such that it can be reset by the force of a spring 15, and specifically from its actuating position shown in FIG. 3B into its rest position shown in FIG. 3A.

For this purpose, according to the embodiment the spring 15 is assigned to the emergency actuating element 11, 12, 13. It can be seen from FIG. 3A, in this first variant, that the spring 15 is designed as a helical spring and surrounds the emergency actuating element 11, 12, 13 at least in part, or the emergency actuating element 11, 12, 13 passes through the spring 15. For this purpose, the emergency actuating element 11, 12, 13 is equipped with a front-side guide region 11 of a larger diameter, and a adjoining passage region 12 of smaller diameter. A plate-shaped actuating surface 13 is provided on the head side of the passage region 12, which in this variant is designed such that, for example, a user presses their thumb onto the actuating surface 13 in question and thereby transfers the emergency actuating element 11, 12, 13, in the form of an actuating pin 11, 12, 13, to the right in the illustration according to FIG. 3B, from the rest position shown (FIG. 3A) into the actuation position shown (FIG. 3B).

It can be seen that, for this purpose, the spring 15 surrounds the passage region 12 and is arranged on a wall of the lock housing 1 in the region of an opening 16 of the lock housing 1. The passage region 12 of the emergency actuating element or actuating pin 11, 12, 13 passes through this opening 16 of the lock housing 1. In this case, the spring 15 is arranged between the plate-like actuating surface 13 and the lock housing 1. The guide region 11 in turn dips into a guide 17 in the interior of the lock housing 1, and can be linearly moved back and forth in this guide 17. Since the guide region 11 has a larger diameter compared to the passage region 12, the restoring movement of the emergency actuating element or actuating pin 11, 12, 13, which is acted upon by the spring 15, is limited in that the guide region 11 approaches, on the inside and with a head-side stop, a wall region of the lock housing 1 surrounding the opening 16.

The further second variant according to FIGS. 4A and 4B of the emergency actuating element or actuating pin of the 11, 12, 13 has a comparable design, but has dispensed with the spring 15 for the resetting. Rather, the procedure here is such that the emergency actuating element 11, 12, 13 is manually reset, and a handle 18 connected to the emergency actuating element 11, 12, 13 is provided for this purpose. The handle 18 on the emergency actuating element 11, 12, 13 is a flexible handle 18 which, according to the embodiment, is designed as a cable or string having an eyelet, such that, via the eyelet, a user can reset the emergency actuating element 11, 12, 13 with a finger, which means, in the embodiment according to FIGS. 4A and 4B in the representation according to FIG. 4B, that the emergency actuating element or the actuating pin 11, 12, 13 is moved to the left in the direction of the arrow indicated in FIG. 4B. FIG. 4A then shows the emergency actuating element 11, 12, 13 in its rest position. In contrast, the representation according to FIG. 4B corresponds to the actuating position of the emergency actuating element or actuating pin 11, 12, 13.

According to the embodiment, the handle 18 and the emergency actuating element 11, 12, 13 are designed as a structural unit, and in particular an integral structural unit. For this purpose, the flexible handle 18 is molded onto the emergency actuating element 11, 12, 13, which is consequently is a plastics injection molded part in each case.

With the aid of the emergency actuating element or the actuating pin 11, 12, 13, in the embodiment according to FIG. 3 the pawl 2 is acted on indirectly, specifically by interposing the release lever 8. Of course, direct action on the pawl 2 is also conceivable. Furthermore, it can also be seen in all embodiments that the emergency actuating element or the actuating pin 11, 12, 13 penetrates the opening 16 in the lock housing 1 in a sealing manner. A seal 19 is provided for this purpose. According to the embodiment, the seal 19 is designed as an O-seal embedded in the actuating pin 11, 12, 13. Indeed, the seal or O-seal 19 in question is located in the guide region 11 of the emergency actuating element or actuating pin 11, 12, 13. In this way, the invention ensures that no moisture, dust, etc. can penetrate through the opening 16 and into the interior of the lock housing 1.

Just like the emergency actuating element 11, 12, 13, including the connected handle 18, the lock housing 1 is made of plastics material, for example formed as an injection molded plastics part. As a result, the guide 17 for receiving the guide region 11 of the emergency actuating element 11, 12, 13 is also made of plastics material. In this way, not only a simple and cost-effective production is provided, but rather the emergency actuating element 11, 12, 13 is also received in a particularly low-friction manner in the interior of the lock housing 1 or the associated guide 17. This is because low friction plastics material/plastics material is typically observed at this point.

The emergency actuating element or the actuating pin 11, 12, 13 is arranged as a whole in a manner concealed behind a detachable trim 20, and consequently is not visible and thus also protected from tampering. In order to consequently be able to act on the actuating pin 11, 12, 13 in question, the detachable trim 20 must first be opened or removed. According to the embodiment, this is an interior trim of an associated motor vehicle door or also an outside trim, or both. This has already been described in the introduction.

LIST OF REFERENCE SIGNS

Lock housing 1
Locking mechanism 2, 3
Pawl 2
Rotary latch 3
Lock case 4
Opening drive 5, 6, 7
Worm wheel 6
Contour 7
Release lever 8
Axis 9
Axis 10
Emergency actuation element 11, 12, 13
Guide region 1
Passage region 12
Actuating surface 13
Stop 14
Spring 15
Opening 16
Guide 17
Handle 18
O-seal 19
Trim 20

The invention claimed is:

1. A motor vehicle lock comprising:
a locking mechanism including a rotary latch and a pawl,
an electrical opening drive for the locking mechanism,
a release lever mounted coaxially with the pawl and coupled to the pawl in a rotationally fixed manner,
an emergency actuating element for manual emergency opening of the locking mechanism,
wherein:
the emergency actuating element is designed such that the emergency actuating element is reset from an actuating position into a rest position by the force of a spring, and
the emergency actuating element is designed as an actuating pin that acts directly on the release lever, and
a seal embedded in the actuating pin to sealingly engage a lock housing.

2. The motor vehicle lock according to claim 1, wherein the spring is associated with the emergency actuating element and surrounds the emergency actuating element.

3. The motor vehicle lock according to claim 1, wherein the spring is designed as a pawl spring.

4. A motor vehicle lock comprising:
a locking mechanism including a rotary latch and a pawl,
an electrical opening drive for the locking mechanism,
a release lever mounted coaxially with the pawl and coupled to the pawl in a rotationally fixed manner, and
an emergency actuating element for manual emergency opening of the locking mechanism,
wherein:
the emergency actuating element is blocked in an actuating position and is designed such that it can be manually reset into a rest position, and
the emergency actuating element is designed as an actuating pin that acts directly on the release lever, and
a seal embedded in the actuating pin to sealingly engage a lock housing.

5. The motor vehicle lock according to claim 4, wherein a connected handle is provided for manually resetting the emergency actuating element.

6. The motor vehicle lock according to claim 5, wherein the handle is designed as a flexible handle that acts on the emergency actuating element, such as cable, cord, pull, Bowden cable, etc.

7. The motor vehicle lock according to claim 5, wherein the handle and the emergency actuating element define a structural unit, in particular an integral structural unit made of plastics material.

8. The motor vehicle lock according to claim 1, wherein the emergency actuating element passes through an opening in a lock housing in a sealing manner.

9. The motor vehicle lock according to claim 1, wherein the emergency actuating element is arranged behind a detachable trim, wherein the detachable trim is an interior trim of an associated motor vehicle door.

10. The motor vehicle lock according to claim 4, wherein the emergency actuating element is blocked in the actuating position by frictional forces of a guide region of the motor vehicle lock.

11. The motor vehicle lock according to claim 1, wherein the actuating pin has a stepped diameter with a front-side guide region that engages in a cylindrical guide in a lock housing, and an adjoining passage region having a diameter smaller than a diameter of the front-side guide region, wherein the passage region passes through an opening in the lock housing and carries a plate-shaped actuating surface on a head side of the passage region, and wherein the actuating surface has a diameter larger than the diameter of the passage region.

12. The motor vehicle lock according to claim 11, wherein the spring is arranged between the actuating surface and the lock housing.

* * * * *